Oct. 21, 1924.

R. J. BURROWS

AXLE FOR MOTOR VEHICLES

Filed July 12, 1919     2 Sheets-Sheet 1

1,512,401

Witness
Milton Lenoir

Inventor
Robert J. Burrows.
By
Adams Jackson.
Attorneys

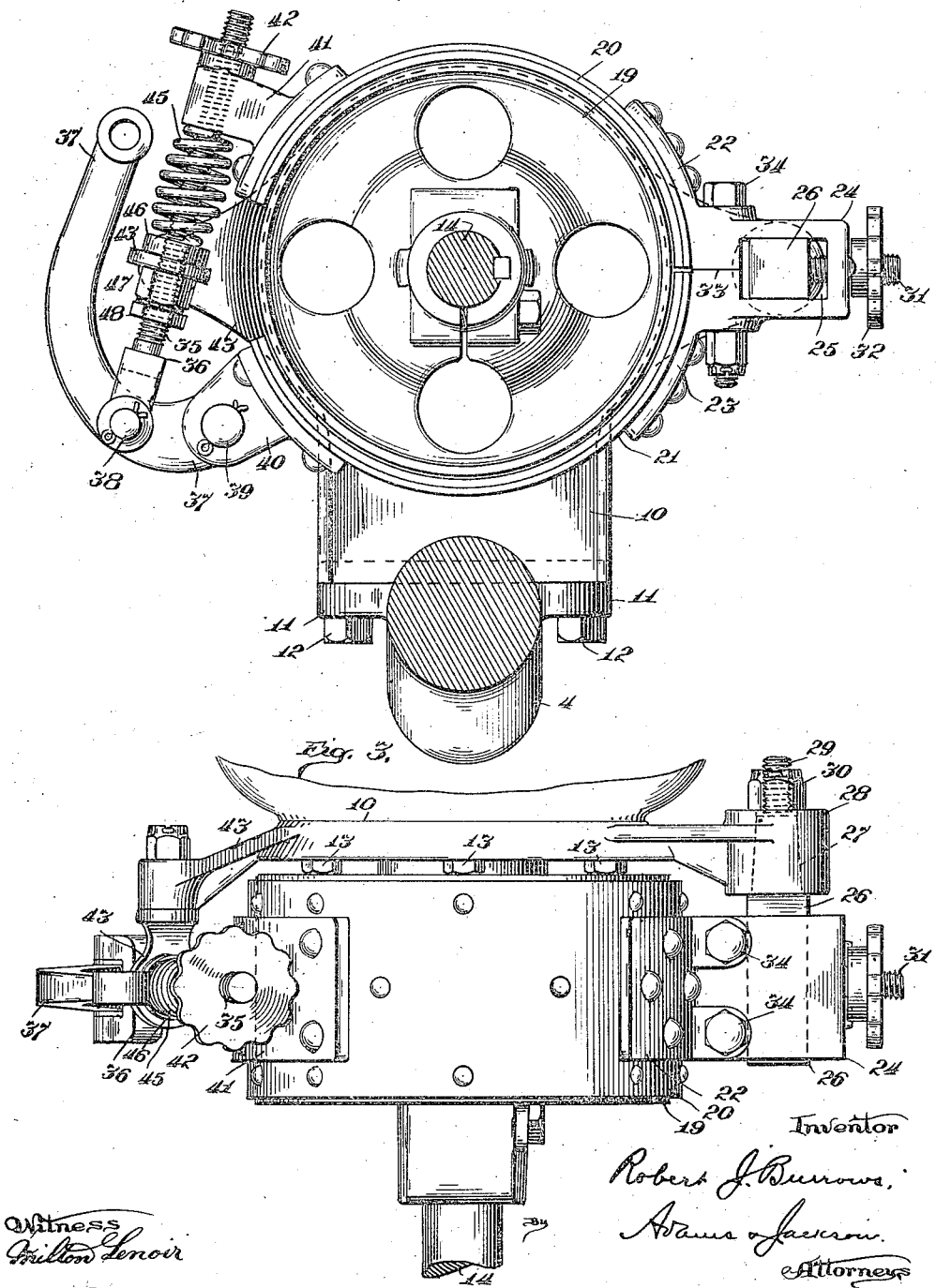

Patented Oct. 21, 1924.

1,512,401

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

AXLE FOR MOTOR VEHICLES.

Application filed July 12, 1919. Serial No. 310,424.

*To all whom it may concern:*

Be it known that I, ROBERT J. BURROWS, a citizen of the United States, and a resident of Buchanan, in the county of Berrien and State of Michigan, have invented certain new and useful Improvements in Axles for Motor Vehicles, of which the following is a specification, reference being had to the accompanying drawings.

My invention relates to axles for motor vehicles of the type in which the ground-engaging wheels are mounted on spindles carried at the ends of a dead axle member and are driven by jack shafts through intermediate gears carried respectively by said jack shafts and the wheels, the jack shafts being themselves driven through the usual differential mechanism. It has to do particularly with axles of this type in which the differential housing is supported by and secured to the dead axle member, and has for its object to provide an improved axle in which the vehicle brakes are associated with the jack shafts, instead of with the wheels as is the usual practice. The nature of my improvements will appear from the following description of my improved axle and the illustration thereof presented in the accompanying drawings. What I regard as new is set forth in the claims.

In the accompanying drawings,—

Fig. 2 is an enlarged vertical cross-section on line 2—2 of Fig. 1; and

Fig. 3 is an enlarged partial plan view.

Figure 1:
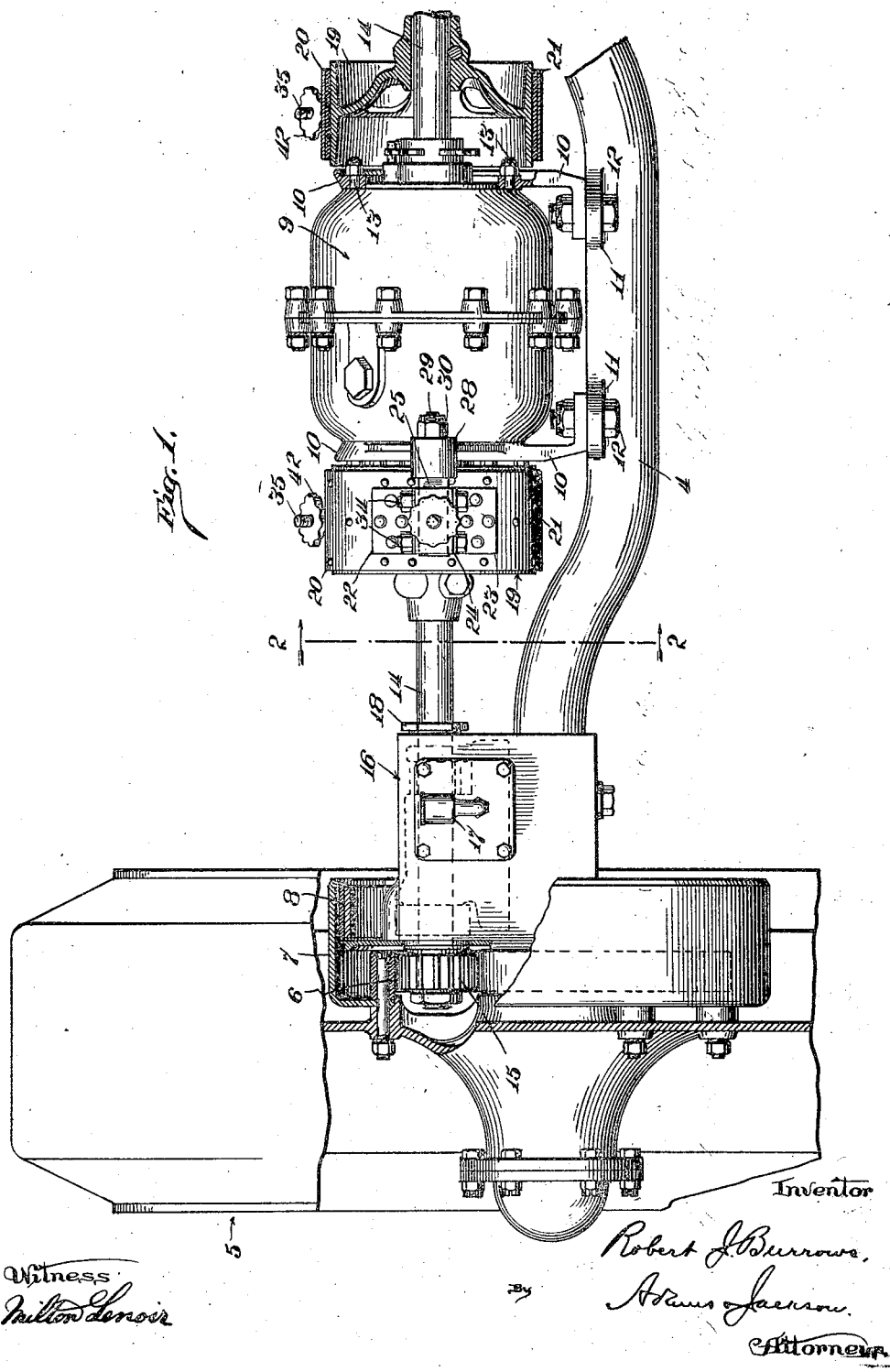
Fig. 1 is a rear elevation of the greater part of an axle embodying my improvements, showing one of the wheels in position, certain parts being in section.

In the embodiment of my invention illustrated, 4 indicates the dead axle member which is provided with the usual wheel spindles at its ends, and 5 indicates one of the vehicle wheels mounted on one of said spindles in any suitable way. Said wheel is provided with a driving gear 6 at the inner side thereof, preferably an internal gear, and, in the construction illustrated, it is also provided with a brake drum 7 so that if desired the usual internal brake 8 may be employed in addition to the jack shaft brakes hereinafter described. The brake drum 7 and internal brake 8 are, however, unnecessary, and may well be omitted.

9 indicates the differential housing which, in the construction illustrated, is arranged over the dead axle member 4 and is firmly secured thereto by means of brackets 10 fitted upon laterally-projecting lugs 11 carried at the opposite sides of the dead axle member adjacent to the longitudinal center thereof and detachably secured thereto by bolts 12. The upper portions of the brackets 10 are annular in form, as shown at the right in Fig. 1, and these annular portions of the brackets fit against the end portions of the differential housing, and are detachably secured thereto by bolts 13. 14 indicates the jack shafts which extend over the dead axle member 4, their inner ends being fitted in suitable bearings in the differential housing 9, and being connected in any suitable way with the differential gearing in said housing. The outer end of each jack shaft 14 is provided with a spur pinion 15 which meshes with the driving gears 6 carried by the wheels 5, as shown at the left in Fig. 1. The outer end portions of said jack shafts extend through boxes or housings 16 which are non-rotatably secured upon the end portions of the dead axle member 4 adjacent to the wheel spindles, and enclose end and intermediate bearings for said jack shafts, as shown and described in my application of even date herewith, Serial No. 310,425, and also means for lubricating said bearings, constructed as shown and described in my application of even date herewith, Serial No. 310,426. 17 indicates an oil cup through which oil is supplied to a reservoir contained within the housing 16, as shown and described in my said application, Serial No. 310,426, and 18 indicates a stuffing-box around the jack shaft 14 for preventing dust and dirt from entering the housing 16, and also for preventing the escape of oil therefrom.

From the foregoing description it will be understood that the jack shaft 14 is a continuous shaft extending from the point of its connection with the differential gearing to the point of its connection with the driving gear 6. The construction at both ends of the axle is the same.

19 indicates brake drums in the form of pulleys mounted upon and secured to the inner end portions of the jack shafts 14 adjacent to the brackets 10. 20—21 indicate respectively the upper and lower members of an external brake fitted around the brake drum 19 for cooperation therewith. The brake members 20—21 are secured at one end respectively to the upper and lower arms 22—23 of a bracket or yoke 24 having a rectangular transversely-extending passage or socket 25 into which fits one end portion of a supporting block 26, as shown in Figs. 2 and 3. The block 26 is provided with a tapered shank 27, shown in dotted lines in Fig. 3, which fits in a suitable socket carried by a lug 28 projecting at one side of the bracket 10, as shown in Fig. 3. The end portion of the shank 27 is reduced and screw-threaded, as shown at 29 in Fig. 3, to receive a nut 30 which serves to seat the shank 27 in its socket and holds the block 26 firmly in position. The portion of the block 26 which fits in the recess 25 is provided with a rearwardly-projecting screw-threaded pin or bolt 31 which extends through a hole in the bracket 24 and has fitted upon it an adjusting nut 32 which is adapted to bear upon the outer face of the bracket 24. Thus by adjusting the nut 32 the bracket 24 may be moved radially with reference to the brake drum to adjust the position of the brake members 20—21. The bracket 24 is split between its inner face and the recess 25, as shown at 33 in Fig. 2, the inner portions of said bracket being adjustably connected by bolts 34 which pass through the split portions of the bracket at the inner side of the recess 25, as shown in Figs. 2 and 3, thus holding the arms 22—23 in fixed relation to each other, but permitting adjustment thereof.

The opposite ends of the brake members 20—21 are operatively connected together by means of a screw-threaded connecting rod or bolt 35 which is provided at one end with a yoke 36, by which it is connected to the intermediate portion of an operating lever 37, for this purpose the yoke 36 being fitted upon a pin 38 carried by said lever. Said lever is fulcrumed upon a pivot 39 carried by a lug 40 secured to the brake member 21 near the free end thereof, as shown in Fig. 2. The opposite end of the connecting rod 35 extends loosely through a suitable passage in a lug 41 secured to the free end portion of the brake member 20, and the outer end of said connecting rod is provided with an adjusting nut 42 screwed upon it into engagement with the outer surface of the lug 41. Thus by swinging the lever 37 in a counterclockwise direction as viewed in Fig. 2, the brake members 20—21 will be drawn together and moved into operative engagement with the brake drum 19. The connecting rod 35 extends through a suitable passage in a guide bracket 43 mounted on a lug 44 carried by the bracket 10, as shown in Fig. 3, and a spring 45 is mounted on said rod between the inner side of the lug 41 and the bracket 43, a collar 46 being preferably interposed between the spring 45 and the latter bracket. This spring serves to return the brake member 20 to its inoperative position when the lever 37 is actuated to release the brake. 47 indicates a nut screwed upon the connecting rod 35 below the guide bracket 43 to serve as a stop to limit the upward movement of the rod 35 under the action of the spring 45, and thereby determine the normal or inoperative position of the brake members 20—21, and 48 indicates a lock nut which serves to hold the nut 47 in position. It will be understood that the lever 37 is connected in any suitable way with the usual brake-operating lever or levers.

It will be observed that as the brackets 10, which entirely support the brakes and the operating mechanism therefor, are rigidly secured to the dead axle member, the braking strains are absorbed directly by said brackets and the dead axle member, and are not transmitted to the differential housing or gear case, and consequently said housing may be of much lighter construction than would be necessary if the braking strains were absorbed by it. By associating the brakes with the jack shafts, and mounting them in the manner described, the brakes may be removed for relining without taking the wheels off the axle, and without taking the axle out from under the vehicle, which is obviously advantageous. Also my improved construction makes it practicable to use much larger and more powerful brakes, since the braking surfaces may have greater wearing area and they act through a considerably greater ratio at the wheels. A further advantage of associating the brakes with the jack shafts is that there is no chance of oil or grease getting to them, as is the case where the brake drums are applied to the wheels in juxtaposition to the driving gears. By mounting the brake drums on continuous jack shafts in the manner described, the use of universal joints is avoided, and a much safer and more reliable construction is obtained. When it is desired to repair the differential gearing, the housing 8, with the parts mounted therein, may readily be removed by removing the bolts 12 after the wheels 5 have been removed and the jack shafts have been withdrawn from the differential housing. The vehicle springs are mounted on the housings 16, to which they are firmly secured, and as said housings are keyed to the dead axle member 4, the torque strains set up by the differential gearing and transmitted through the jack shafts 14 are absorbed by said springs. By mounting the differential housing and the jack shafts above the dead axle member 4 in the manner described, the center line of the propeller shaft by which the differential gearing is driven from the source of power is raised in height, giving very nearly the ideal straight line drive to the transmission. The construction described provides an improved axle which is lighter and cheaper than axles in which the jack shafts are arranged either in front of or behind the dead axle member, and one in which there is greater road clearance.

What I claim as my invention and desire to secure by Letters Patent, is—

1. The combination with a dead axle member, of a differential housing, differential gearing therein, brackets secured to said dead axle member separately from the differential housing and separably connected with the opposite end portions of said housing, jack shafts extending into said housing and connected with said differential gearing, brake drums non-rotatably mounted on said jack shafts adjacent to said brackets, and brakes cooperating with said brake drums and supported by said brackets independently of the differential housing.

2. The combination with a dead axle member, of a differential housing, differential gearing therein, brackets secured to said dead axle member separately from the differential housing and having annular portions detachably secured to opposite end portions of said differential housing for supporting the same from said dead axle member, jack shafts extending into said housing through the annular portions of said brackets and connected with said differential gearing, brake drums non-rotatably mounted on said jack shafts adjacent to said brackets, and brakes cooperating with said brake drums and supported by said brackets independently of the differential housing.

3. The combination with a dead axle member, of a differential housing arranged above said dead axle member, differential gearing therein, brackets directly secured to said dead axle member and detachably secured to the end portions of said housing, jack shafts extending over said dead axle member into said housing and connected with said differential gearing, brake drums non-rotatably mounted on said jack shafts adjacent to said brackets, and brakes cooperating with said brake drums and supported by said brackets independently of the differential housing.

4. The combination with a dead axle member and wheels mounted thereon, of a differential housing secured to said dead axle member, differential gearing therein, unitary jack shafts operatively connected with said wheels and extending into said differential housing and connected with said differential gearing, brake drums non-rotatably mounted on said jack shafts, brakes cooperating with said brake drums and separable brackets connected with said dead axle member independently of the differential housing and supporting said brakes.

5. The combination with a dead axle member and wheels mounted thereon, of a differential housing arranged over said dead axle member, differential gearing therein, brackets secured to the dead axle member and having annular portions bolted to the end portions of the differential housing, unitary jack shafts extending through said brackets over said dead axle member, said jack shafts being operatively connected with said wheels and extending into said differential housing and connected with said differential gearing, brake drums non-rotatably mounted on said jack shafts, and brakes mounted on said brackets and cooperating with said brake drums.

ROBERT J. BURROWS.

Certificate of Correction.

It is hereby certified that in Letters Patent No. 1,512,401, granted October 21, 1924, upon the application of Robert J. Burrows, of Buchanan, Michigan, for an improvement in "Axles for Motor Vehicles," an error appears in the printed specification requiring correction as follows: Page 3, line 75, claim 5, strike out the words "through said brackets" and insert the same to follow after the word "extending" in line 78, same claim; and that the said Letters Patent should be read with these corrections therein that the same may conform to the record of the case in the Patent Office.

Signed and sealed this 18th day of November, A. D. 1924.

[SEAL.]                  KARL FENNING,
*Acting Commissioner of Patents.*